Sept. 25, 1928.  F. AESCHBACH  1,685,186

KNEADING MACHINE

Filed Jan. 12, 1928  2 Sheets-Sheet 1

INVENTOR:
Friedrich Aeschbach,
By Henry Ortiz Jr
atty

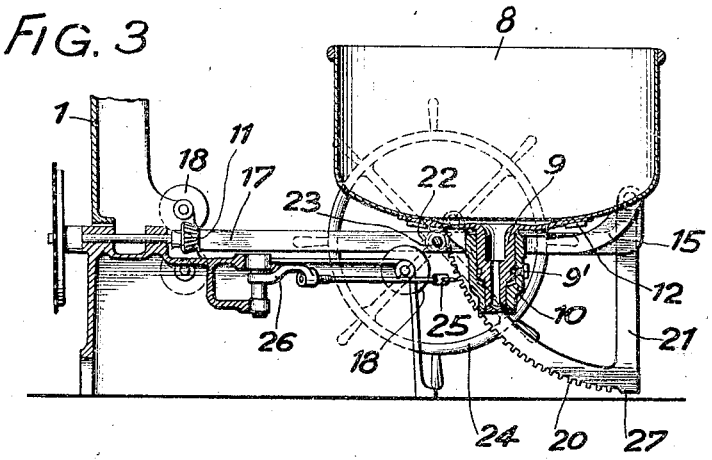
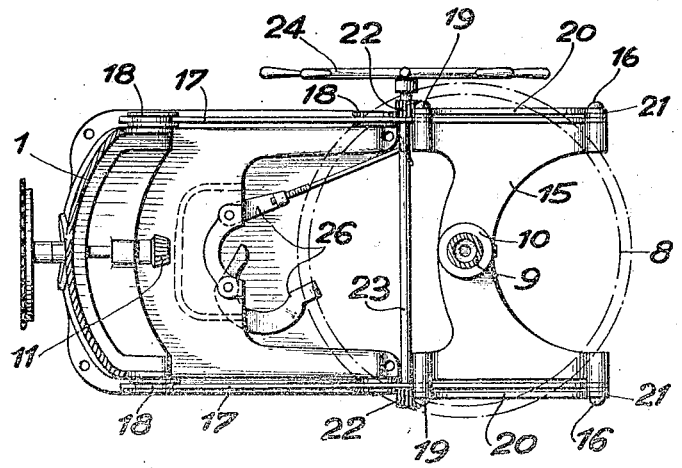

Patented Sept. 25, 1928.

1,685,186

UNITED STATES PATENT OFFICE.

FRIEDRICH AESCHBACH, OF AARAU, SWITZERLAND.

KNEADING MACHINE.

Application filed January 12, 1928, Serial No. 246,270, and in Switzerland November 21, 1927.

The present invention refers to kneading and mixing machines of the type having a trough adapted to be displaced in the lateral direction and to be tilted. The kneading machine further comprises two kneading arms and means to move the arms in elliptical paths so that parts of the two arms pass each other in close proximity in counter directions from time to time to exert a shearing and mixing action on dough in the trough.

The kneading machine according to the present invention is characterized by the fact that the trough is supported in a frame tiltably arranged on rails adapted to be lengthwise displaced in the frame of the machine.

Figure 1:
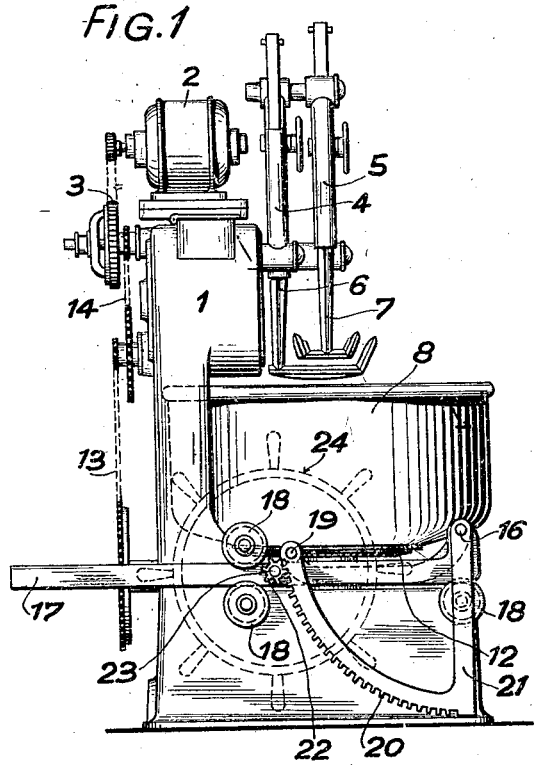
Figure 2:
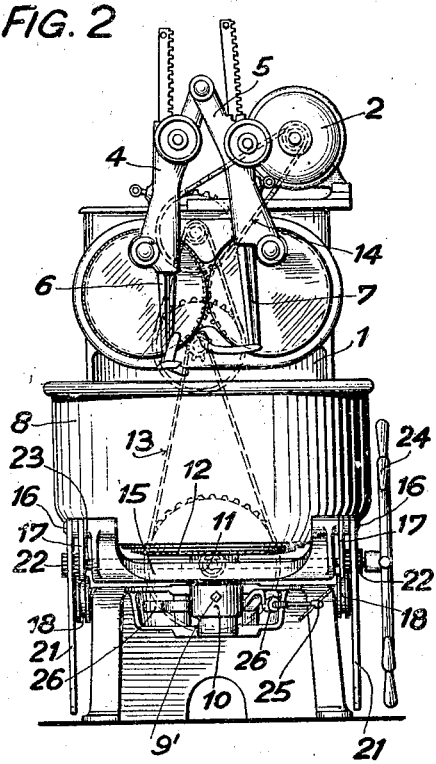
Figure 4:
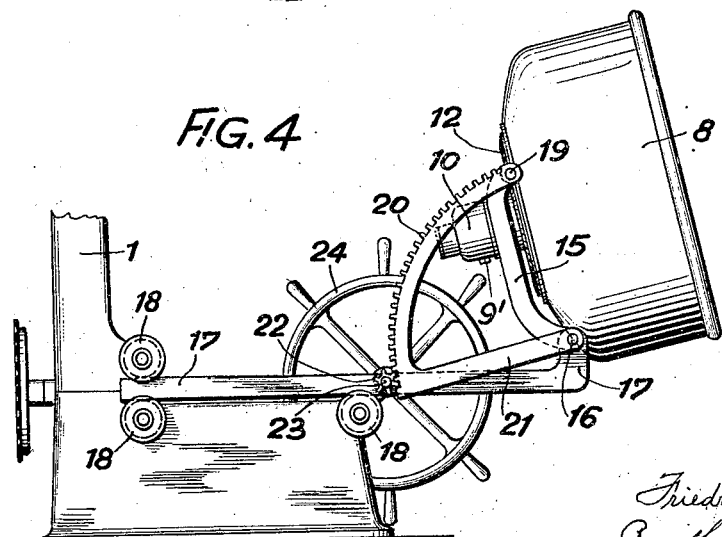

A constructional example of the subject matter of the present invention is illustrated on the accompanying drawings, in which Fig. 1 is a side elevation of the machine with the trough shown in the working position, Fig. 2 is a front elevation of the machine shown in Fig. 1, Fig. 3 shows in a vertical section the lower part of the machine with the trough in its outer extreme position, Fig. 4 shows in a side elevation the lower part of the machine with the trough in its outer extreme and tilted position, and Fig. 5 is a plan view with parts shown in horizontal section of the lower part of the machine with the trough removed.

Referring now to the drawings 1 denotes the frame of the machine. On the frame 1 an electric motor 2 is mounted which causes in a manner known per se by means of a drive 3 the movement of the two guides 4 and 5 for the kneading arms 6 and 7, whereby the latter move in elliptical paths. 8 designates the trough for the dough provided at its bottom with a vertical hollow trunnion 9 rotatably mounted in a bearing 10. A set screw 9' fixed to the bearing 10 cooperates with the trunnion 9 and prevents the trunnion from moving out of the bearing 10 when the trough is tilted. When the trough 8 is in its working position shown in Figs. 1 and 2 a bevel wheel 11 meshes with a toothed rim 12 provided on the bottom of the trough. The bevel wheel 11 is driven from the drive 3 and thereby from the motor 2 by means of chain drives 13 and 14 so that the trough is rotated on its trunnion 9. The bearing 10 is part of a frame 15 (Figs. 3, 4 and 5) provided with four arms. Two of the arms are pivoted at 16 to the ends of rails 17 which are displaceable in the horizontal direction in the machine frame between guide rollers 18. To the other two arms of the frame 15 toothed segments 20 are pivoted at 19 with their one ends whilst at their other ends stiffening members 21 are pivoted at 16. These two segments 20 cooperate with pinions 22 fixed to a common axle 23 which is turned by a hand wheel 24.

In Figs. 1 and 2 the parts of the machine are in the working position with the exception of the kneading arms 6 and 7 which are withdrawn from the trough. The trough 8 rotates about its vertical central axis and the kneading arms 6 and 7 move in elliptical paths when they are lowered into the trough. After the kneading work is finished the kneading arms 6 and 7 are withdrawn from the trough and by means of a handle 25 a clamping member 26, which extends around the bearing 10 and fixes the latter in its position when the trough 8 is in its operative position, is loosened and the bearing 10 is thus freed. Then the trough 8 is displaced in the lateral direction by pulling trough and rails 17 from the position shown in Fig. 1 into that shown in Fig. 4. Then by turning the hand wheel 24 which is preferably self-locking, the trough may be tilted into the position shown in Fig. 4 for emptying the trough, whereby stops 27 at the lower ends of the segments 20 limit the extent of the angular movement of the trough 8 about the pivots 16. After the dough has been removed from the trough the latter together with the frame 15 may be tilted back into the normal position shown in Fig. 15 by turning the hand wheel in the opposite direction to which it has been turned previously. Then the trough 8 together with the rails 17 is pushed back from the position shown in Fig. 3 into the working position shown in Fig. 1, whereupon the clamping member 26 is caused to surround again the bearing 10 and is fixed in position by turning the handle 25, whereby the position of the trough and of the rails in the frame is secured.

The above described manner of mounting the troughs brings the advantage over the known manner, in which the trough is displaced along stationary rails and is then tilted, that the rails do not project beyond the trough when the latter is in its working position, so that the handling of the machine and of the trough is unobstructed.

I claim:

1. In a mixing and kneading machine, in combination, a machine frame, a kneading trough, a frame in which said trough is rotatably mounted, and rails adapted to be endwise displaceable in said machine frame in substantially horizontal direction, said frame being mounted in a tiltable manner on said rails.

2. In a mixing and kneading machine, in combination a machine frame, a kneading trough, a frame in which said trough is rotatable about a vertical axis, rails adapted to be endwise displaceable in said machine frame in a substantially horizontal direction, said frame being mounted in a tiltable manner on said rails, and means adapted to tilt said trough relatively to said rails.

3. In a mixing and kneading machine, in combination, a machine frame, a kneading trough, a frame in which said trough is rotatable about a vertical axis, rails adapted to be endwise displaceable in said machine frame in a substantially horizontal direction, said frame being pivoted to the one ends of said rails, toothed segments connected with one end to said frame, and pinions cooperating with said toothed segments for tilting the frame and thereby said trough.

4. In a mixing and kneading machine, in combination, a machine frame, a kneading trough, a frame in which said trough is rotatable about a vertical axis, rails adapted to be endwise displaceable in said machine frame in a substantially horizontal direction, said frame being pivoted to the one ends of said rails, toothed segments connected with one end to said frame, pinions cooperating with said toothed segments for tilting the frame and thereby said trough, and disconnectable means adapted to fix said frame to said machine frame.

5. In a mixing and kneading machine, in combination, a machine frame, a kneading trough, a frame in which said trough is rotatable about a vertical axis, rails adapted to be endwise displaceable in said machine frame in a substantially horizontal direction, said frame being pivoted to the one ends of said rails, toothed segments connected with one end to said frame, pinions cooperating with said toothed segments for tilting the frame and thereby said trough, a turnable clamping member adapted to grip around an extension of said frame, and a screw threaded spindle cooperating with said clamping member for fixing the latter in its closed position.

In testimony whereof I have signed my name to this specification.

FRIEDRICH AESCHBACH.